Aug. 15, 1950 L. S. WILLIAMS 2,518,585
WEIGHING SCALE INDICATOR DRIVE
Filed June 27, 1947 2 Sheets-Sheet 1
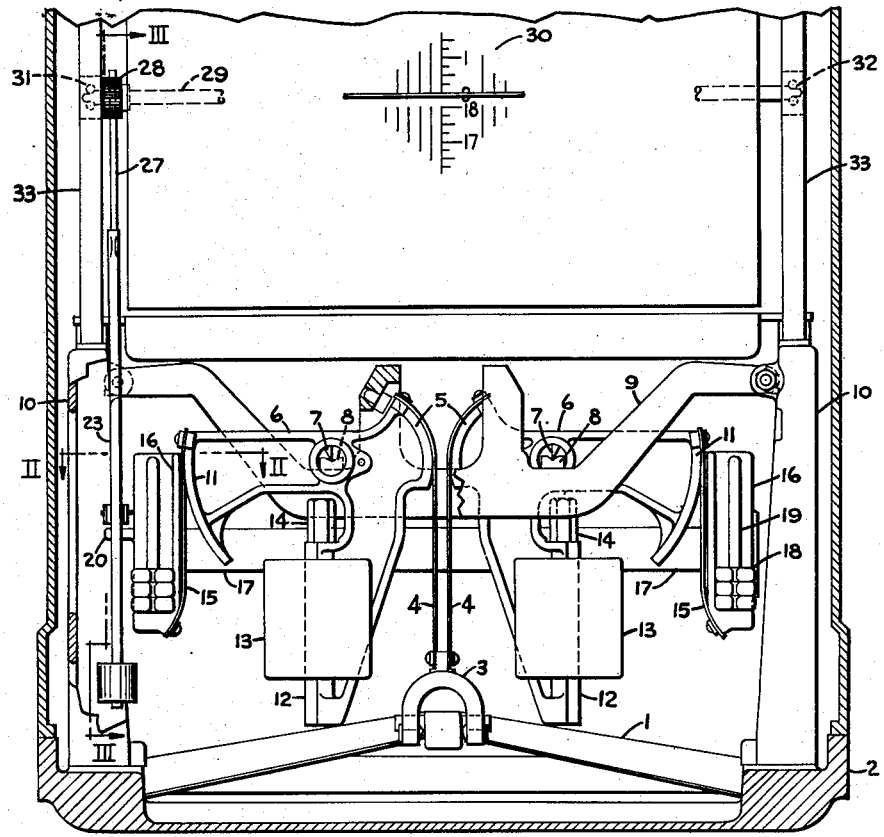
*Fig. I*
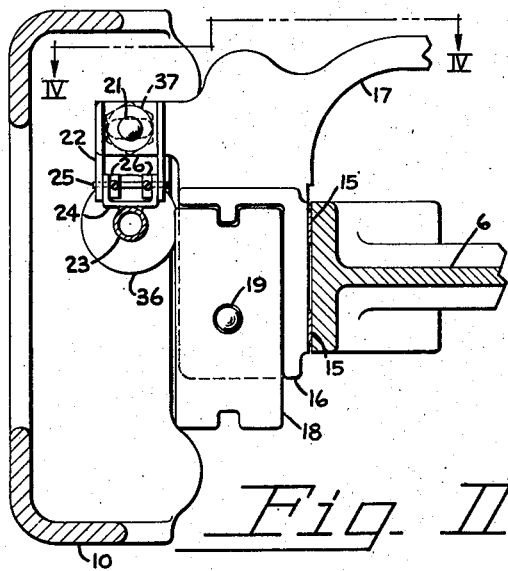
*Fig. II*
INVENTOR.
Lawrence S. Williams
BY
Marshall and Marshall
ATTORNEYS

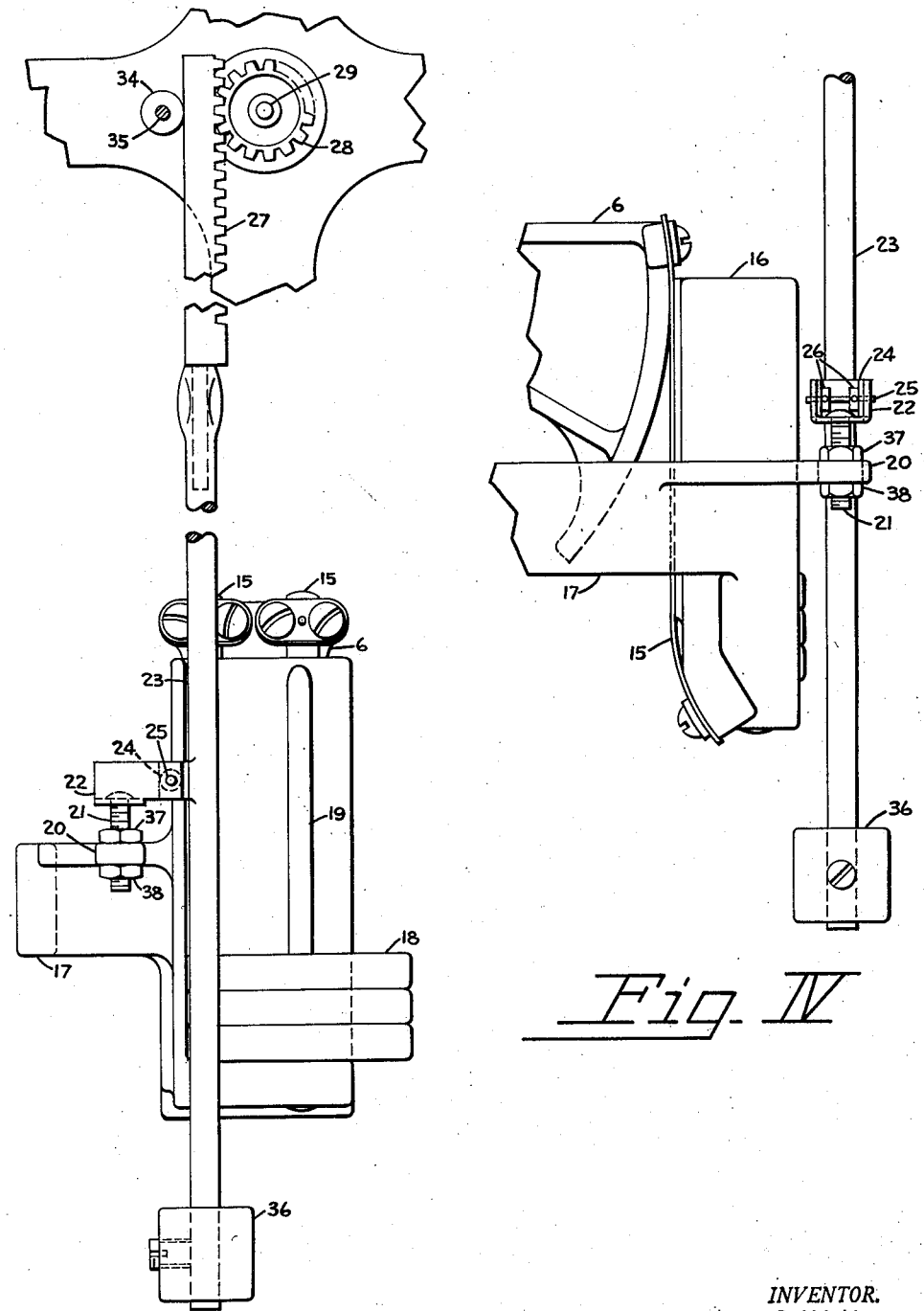

Patented Aug. 15, 1950

2,518,585

UNITED STATES PATENT OFFICE 2,518,585

WEIGHING SCALE INDICATOR DRIVE

Lawrence S. Williams, Toledo, Ohio, assignor to Toledo Scale Company, Toledo, Ohio, a corporation of New Jersey Application June 27, 1947, Serial No. 757,447

3 Claims. (Cl. 74—422)

This invention relates to weighing scales and in particular to the mechanism for driving an indicator in response to the movement of the load counterbalancing mechanism.

Ordinarily, the mechanism for driving a weighing scale indicator consists of a rack that is connected to and moved by the counterbalancing mechanism and a pinion that meshes with the rack and that is mounted on an indicator shaft in a manner such that the longitudinal movement of the rack is translated into rotary movement of the indicator. In many weighing scales the rack is suspended from a portion of the load counterbalancing mechanism and in other types of scales the bottom end of the rack is pivotally mounted on a portion of the load counterbalancing mechanism. As long as a weighing scale remains perfectly horizontal this method of mounting a rack does not lead to any difficulties. However, load counterbalancing mechanisms have been devised that provide accurate load counterbalancing effect regardless of the condition of level of the weighing scale. As a result of these developments many weighing scales are used without first being brought to a condition of level. Under out-of-level conditions the pressure between the rack and the pinion varies from the force that is exerted when the scale is level and if the force increases there is an increase in the error of the scale due to friction while, if the scale is tipped in the opposite direction, it is entirely possible that the rack may actually tend to leave the pinion so that a considerable amount of backlash may be present.

The object of this invention is to provide a rack and rack rod assembly in which substantially constant meshing pressure between the rack and the pinion on the indicator shaft is maintained regardless of an out-of-level condition of the scale that may be encountered in ordinary use.

An ancillary object is to provide a mounting for a rack and rack rod assembly that is simple to construct and that provides easy adjustment to obtain accurate alignment of the rack with respect to the pinion.

These and more specific objects and advantages are attained by balancing the rack and rack rod assembly such that its center of gravity is in approximately the same horizontal plane as its point of support but is displaced from a vertical plane through the point of support.

A weighing scale embodying a preferred form of the invention is illustrated in the accompanying drawings.

In the drawings:

Figure I is a rear elevation of a weighing scale embodying the invention.

Figure II is an enlarged fragmentary horizontal section taken substantially along the line II—II of Figure I.

Figure III is an enlarged fragmentary end elevation of the indicator driving mechanism and adjacent parts of the load counterbalancing mechanism as seen from the line III—III of Figure I.

Figure IV is an enlarged fragmentary elevation taken along the line IV—IV of Figure II.

These specific figures and the accompanying description are intended merely to illustrate the invention and not to impose limitations on the claims.

In a weighing scale constructed according to the invention, as illustrated in Figure I, forces from a load receiver (not shown) are transmitted through a lever 1 fulcrumed in a base 2 to a stirrup 3 which is suspended from power ribbons 4 that overlie and are attached to the upper ends of power sectors 5 of a pair of pendulum bodies 6. The pendulum bodies 6 incorporate knife edges 7 that rest on bearings 8 mounted in a bridge 9 spanning the space between a pair of uprights 10 erected from the base 2. In addition to the power sectors 5, each of the pendulum bodies 6 includes a second sector 11 that is concentric with respect to its knife edge 7 and a straight track 12 on which a capacity adjusting weight 13 is slidably mounted. A threaded rod extending along the straight track 12 engages a portion of the capacity adjusting weight 13 so that rotation of the hexagonal nut 14 on the top end of the rod adjusts the position of the weight 13 along the track.

Flexible ribbons 15 depending from the upper ends of the concentric or second sectors 11 support weight receptacles 16 that are rigidly interconnected by a tie bar 17. The weight receptacles 16 and tie bar 17 constitute a loading frame that is moved vertically through increments of distances that are exactly proportional to the increments of angle through which the pendulum bodies 6 rotate in counterbalancing a load. The total weight of the loading frame is adjusted by adding or removing weights 18 stacked on stems 19 of the weight receptacles 16 until correct half capacity indication of the weighing scale counterbalancing mechanism is obtained.

An ear 20 (see also Figures III and IV) extending laterally from one end of the tie bar 17 adjacent one of the weight receptacles 16 carries a stud 21 to the upper end of which a U-shaped bracket 22 is secured. A rack rod 23 having attached thereto a bracket 24 is pivotally supported from the U-shaped bracket 22 by a pin 25 passed horizontally through adjacent portions of the brackets 22 and 24. A pair of collars 26 secured to the pin 25 hold the pin in position.

The rack rod 23 extends upwardly and downwardly from the bracket 24 and at its upper end carries a rack 27 that meshes with a pinion 28 mounted on a shaft 29 of an indicating shart 30. The shaft 29 is journaled in bearings 31 and 32 supported in standards 33 erected from the top of the uprights 10. Loss of registration of the teeth of the rack 27 with the teeth of the pinion 28 is prevented by a roller 34 that is journaled on a pin 35 extending from the adjacent standard 33. The roller 34 is positioned so that it contacts the rack only when the force transmitted from the rack to the pinion is great enough to drive the rack away from the pinion. During normal operation the rack rests slightly against the pinion 28 with full contact between the teeth of the rack and the teeth of the pinion so that no backlash is present to interfere with the accurate positioning of the chart.

The downwardly extending portion of the rack rod 23 carries a balance weight 36 that is positioned so that the composite center of gravity of the rack 27, the rack rod 23 and the weight 36 is located near the point of support of the rack assembly, i. e., near the pin 25. If the composite center of gravity were located exactly at the pivot pin 25 there would be no force urging the rack 27 into engagement with the pinion 28. Therefore, the composite center of gravity is located in a vertical plane that passes the pivot pin 25 on the side toward the pinion 28. The actual location of the composite center of gravity is such that the turning moment resulting from the weight of the rack rod assembly multiplied by the horizontal distance between the center of gravity and the pivot pin 25 is equal to the desired rack meshing pressure multiplied by the average distance between the pivot pin 25 and the indicator shaft 29.

For the purpose of adjusting the position of the chart 30 with respect to the position of the loading frame of the load counterbalancing mechanism and for securing accurate alignment of the rack 27 with respect to the pinion 28 the ear 20 is slotted so that the threaded stem 21 may be moved in a direction parallel to the axis of the indicator shaft 29 and the threaded stem 21 is mounted in the ear 20 by means of upper and lower nuts 37 and 38 that permit the height of the bracket 22 and, consequently, the rack rod 23 to be adjusted with respect to the height of the loading frame of the load counterbalancing mechanism.

The location of the center of gravity of the rack rod assembly is important if low rack meshing pressures are to be employed and if the scale is to be used without being precisely level. If the center of gravity of the rack and rack rod assembly is in the same horizontal plane as the pivot pin 25, the moment exerted by the offset of the center of gravity from the pivot pin, which moment is effective in producing rack meshing pressure, varies according to the cosine of the angle through which the weighing scale is tipped from a condition of level. Since the cosine of an angle varies very slowly when the angle is near zero, it follows that the scale may be tipped through a considerable angle without altering the rack meshing pressure to an appreciable extent.

While it is desirable that the center of gravity be located in substantially the same horizontal plane as the point of support of the rack rod assembly, it is not necessary that this condition be rigidly fulfilled because the center of gravity may be raised or lowered through an appreciable distance before the angle included between a line extending from the pivot point through the center of gravity and a horizontal line becomes large enough so that the meshing pressure varies rapidly with the angle of tip of the scale. In the construction ordinarily employed in a scale for use on a merchant's counter the rack rod is supported at its lower end and the angle subtended between the horizontal and the line passing through the pivot point and the center of gravity lacks only a few degrees of being a right angle with a result that a fifty per cent change in rack meshing pressure may be observed if the scale is tipped through an angle of approximately one degree. In the improved structure according to the invention and insignificant change in rack meshing pressure occurs when the scale is tipped through a corresponding angle.

In the construction shown in the drawings the pivot pin 25 is sufficiently long so that the rack is accurately guided and maintained in position when the scale is tipped sidewise. Restraint of the rack in this direction does not affect the rack meshing pressure but merely serves to guide the rack along a predetermined path with respect to the pinion.

The constancy of rack meshing pressure may be obtained with other types of pivotal connection since the only requirement is that the center of gravity of the rack rod assembly be located within a resonable vertical distance from a horizontal plane through the point of support. The provision of a balancing weight on the lower end of the rack rod permits the center of gravity to be located in the desired region. It is not necessary that the balance weight be adjustable because the manufacturing tolerances are sufficiently small so that the distribution of mass may be predetermined with entirely satisfactory results.

Various modifications may be made in the specific structure without sacrificing the advantages attained by balancing the rack to locate its center of gravity adjacent its point of support.

Having described the invention, I claim:

1. In an indicator drive for a weighing scale in which a rack operatively connected to weighing mechanism meshes with and drives a pinion on an indicator shaft, in combination, a rack rod for supporting the rack, a bracket formed on the rack rod, a member extending from the weighing mechanism, means in the member for engaging the bracket to form a pivotal connection between the bracket and the member, and a counterweight depending from the rack rod and positioned to locate the composite center of gravity of the counterweight rack and rack rod at substantially the same elevation as the pivotal connection.

2. In an indicator drive for a weighing scale in which a rack operatively connected to weighing mechanism meshes with and drives a pinion on an indicator shaft, in combination, a rack rod for supporting the rack, a member carried by the weighing mechanism, a pivotal connection between the rack rod and the member, said rack rod having portions extending each way from the pivotal connection, and a weight carried on one of the portions to balance the weight of the rack supported on the other portion, said pivotal connection being located laterally adjacent but not coincident with the composite center of gravity of the rack rod and attached rack and weight.

3. In an indicator drive for a weighing scale in which a rack operatively connected to weighing mechanism meshes with and drives a pinion on an indicator shaft, in combination, a member carried by the weighing mechanism, a rack support attached to and supporting the rack, a pivotal connection between the rack support and the member, and a balancing member attached to the rack support and extending from the support in a direction opposite the rack, said balancing member being of a size and weight such that the center of gravity of the rack, rack support, and balancing member is in substantially the same horizontal plane as the pivotal connection.

LAWRENCE S. WILLIAMS.

REFERENCES CITED

The following references are of record in the file of this patent:

UNITED STATES PATENTS

| Number | Name | Date |
| --- | --- | --- |
| 1,783,826 | Burke | Dec. 2, 1930 |